(12) United States Patent
Mayer (10) Patent No.: US 7,020,359 B2
(45) Date of Patent: Mar. 28, 2006

(54) APPARATUS AND METHODS FOR USING FIBER OPTIC ARRAYS IN OPTICAL COMMUNICATION SYSTEMS

(75) Inventor: Robert C. Mayer, Longmont, CO (US)

(73) Assignee: Optical Communication Products, Inc., Woodland Hills, CO (US)

( * ) Notice: Subject to any disclaimer, the term of this patent is extended or adjusted under 35 U.S.C. 154(b) by 45 days.

(21) Appl. No.: 10/967,847

(22) Filed: Oct. 18, 2004

(65) Prior Publication Data

US 2005/0053337 A1 Mar. 10, 2005

Related U.S. Application Data

(63) Continuation of application No. 10/087,648, filed on Mar. 1, 2002, now Pat. No. 6,816,642.

(51) Int. Cl.
*G02B 6/28* (2006.01)
(52) U.S. Cl. .......................... 385/24; 385/89
(58) Field of Classification Search .............. 385/14, 385/24, 88, 89
See application file for complete search history.

(56) References Cited

U.S. PATENT DOCUMENTS

| 5,394,503 | A | * | 2/1995 | Dietz et al. ............... 385/135 |
|---|---|---|---|---|
| 5,420,954 | A | | 5/1995 | Swirhun et al. ............ 385/92 |
| 5,781,320 | A | | 7/1998 | Byers ........................ 359/123 |
| 5,835,646 | A | * | 11/1998 | Yoshimura et al. .......... 385/14 |
| 5,850,250 | A | * | 12/1998 | Konopka et al. ......... 348/14.07 |
| 5,920,412 | A | | 7/1999 | Chang ....................... 359/128 |
| 5,971,624 | A | | 10/1999 | Giebel et al. ................ 359/59 |
| 6,243,510 | B1 | * | 6/2001 | Rauch ........................ 385/15 |
| 6,304,350 | B1 | | 10/2001 | Doerr et al. ................ 359/130 |
| 6,600,853 | B1 | * | 7/2003 | Wickman et al. ............ 385/24 |
| 6,674,749 | B1 | | 1/2004 | Mattathil .................... 370/353 |
| 6,674,971 | B1 | * | 1/2004 | Boggess et al. ............. 398/139 |
| 6,714,545 | B1 | | 3/2004 | Hugenberg et al. ....... 370/395.1 |
| 6,816,642 | B1 | | 11/2004 | Mayer et al. ................ 385/24 |
| 2002/0181053 | A1 | * | 12/2002 | Goto et al. ................ 359/154 |
| 2004/0098422 | A1 | | 5/2004 | Levesque et al. ........... 707/203 |

* cited by examiner

*Primary Examiner*—Ellen E. Kim
(74) *Attorney, Agent, or Firm*—Barlow, Josephs & Holmes, Ltd.

(57) ABSTRACT

Systems and methods for optical communication that may be employed to couple together fiber optic arrays of two or more optical communication modules using parallel fiber optic connectors and physically distinct and signal-independent optical communication paths. The disclosed systems and methods may be employed to provide separate signal-independent communication paths having signal transport characteristics that meet standards required for single fiber single point-to-single point applications.

33 Claims, 8 Drawing Sheets

APPARATUS AND METHODS FOR USING FIBER OPTIC ARRAYS IN OPTICAL COMMUNICATION SYSTEMS

CROSS-REFERENCE TO RELATED APPLICATIONS

This application is a continuation of and claims priority from earlier filed U.S. patent application Ser. No. 10/087,648, filed Mar. 1, 2002 now U.S. Pat. No. 6,816,642.

BACKGROUND OF THE INVENTION

The present invention relates generally to optical communications, and more particularly to fiber optic communication systems.

Optical communication technologies are employed in a wide variety of communication environments. Examples of such communication environments include, but are not limited to, telecommunications, networking, data communications, industrial communication links, medical communications links, etc. In networking environments, fiber optics have traditionally been employed in the network core as long-haul backbones. More recently, fiber optic technologies have been implemented at the network edge, e.g., in metropolitan area network ("MAN") and local area network ("LAN") environments. Examples of other environments in which optical communication technologies are being deployed include network operation centers, corporate network backbone, central offices, and edge/core aggregation points.

As optical communications have been implemented in edge environments, an increased need has developed for optical interconnect equipment that is capable of alleviating bandwidth bottlenecks by using increased port densities to provide more links at higher speeds within a constrained physical infrastructure. At the same time that service providers are attempting to deploy such higher bandwidth solutions, they face market constraints that increasingly make such solutions more difficult to implement, e.g., reduced capital budgets, physical space limitations, HVAC (heating, ventilation, and air conditioning) limitations, increasing power costs due to limited power grid capacity, etc.

Modern conventional optical communication infrastructures commonly employ 1310 nm-based optical transmission technology for short, immediate, and some long-range links, while more expensive 1550 nm-based technologies are generally reserved to implement longer-haul requirements, often using dense wavelength division multiplexing ("DWDM"). Single mode fiber 1310 nm optical technologies have been employed for short-reach ("SR") and intermediate-reach ("IR") links using the abundance of unused dark fiber available in existing network infrastructures, such as may be found in MAN infrastructures. In this regard, 1310 nm-based optical solutions are denser and more power efficient than 1550 nm-based DWDM solutions. Furthermore, it is less expensive to utilize a separate fiber and 1310 nm optics for transmission of an additional signal in an environment where the separate fiber is already installed and available.

However, despite the implementation of 1310 nm-based optical technologies, service providers still face the problem of how to deploy more 1310 nm interconnects at higher speed and lower cost per bit within the same or smaller physical space, and in a manner that takes advantage of reductions that have been achieved in integrated circuit scale. Smaller systems consume less floor space and power, enabling telecommunications companies to minimize lease expenses for equipment space. Shrinking system footprints also enable carriers to migrate to smaller facilities located nearer to users at the network edge. Optical connectors and associated optical modules have been developed in an attempt to respond to market needs. For example, 1310 nm fiber optic communication technology is now commonly implemented using small form factor ("SFF") connectors, which support two optical fibers within a connector width of approximately 0.55 inches. However, even with use of SFF connector technology, port density improvements have not kept pace with corresponding improvements in scale that have been achieved in integrated circuit design.

BRIEF SUMMARY OF THE INVENTION

Disclosed herein are systems and methods for optical communication that employ parallel fiber optic arrays to couple together two or more optical communication modules via physically distinct and signal-independent optical communication paths in which each signal-independent optical communication path is capable of transporting one or more signals that are separate and independent from other optical communications paths. The disclosed systems and methods may be advantageously implemented to provide a much denser and more power efficient optical interconnect solution for high speed/multi-port optical systems than is available using conventional technology and, in doing so, may be implemented to allow system providers to overcome existing barriers to improvements in density, power efficiency and cost effectiveness. The physically distinct and signal independent optical communication paths provided by the disclosed systems and methods also make possible increased flexibility in system architecture. In one disclosed embodiment, parallel fiber optic connectors may be employed in combination with fiber optic arrays to enable much higher port densities and greater power efficiency than is possible using existing SFF-based devices. For example, commercially available parallel fiber optic connectors commonly employed in single point-to-point parallel ribbon fiber applications (e.g., conventional MTP™ connectors that support up to 12 single-mode fibers in a single ferrule and connector) may be employed to provide separate signal-independent communication paths having transmission characteristics that meet the much more demanding standards required for single fiber single point-to-single point applications, e.g., standards such as may be set by IEEE, ITU and ANSI standards bodies. Surprisingly, such single point-to-point connectors may be used in the disclosed systems and methods to provide multiple (e.g., non-single point-to-single point) communication paths that are physically distinct and signal-independent from each other while also being standards-compliant for each path. In one embodiment, such connectors may also be employed in a manner to support or enable up to four times the number of ports on a card edge as compared to an alternative design based on small form factor devices.

In another disclosed embodiment, parallel fiber optic connectors may be employed in combination with vertical-cavity surface-emitting lasers ("VCSELs") to provide multiple signal-independent optical communication paths in a high density single mode configuration that offers smaller size and reduced power consumption at a lower cost than traditional SFF-based implementations. Using VCSELs enables multiple optical transmitters to be integrated into a single transmit module to which a parallel fiber optic connector, such as an MTP™ connector, may be coupled to provide an independent optical transmitter for each fiber optic port of an MTP™ connector array. In such an implementation, two or more 1310 nm-based transmit and receive array modules (e.g., based on 1310 nm VCSEL technology) may be coupled together, for example, using MTP™ connectors in conjunction with industry standard single and/or duplex fiber connectors. When compared to conventional 1310 nm SFF-based transceivers, such an implementation may be used to realize system-level improvements such as increased system level densities, reduced power supplies, elimination of cooling fans, lower system costs, smaller system footprint for remote and/or space-restricted locations (e.g., remotely located pedestals, distribution cabinets in a multi-tenant unit or corporate campus, elevated installations on utility poles, etc.), increased battery back up time for remote systems, and/or greatly simplified fiber management.

Thus, the disclosed systems and methods may be advantageously used to enable many more signal-independent optical ports to be integrated into a single optical communication system than is possible with existing optical communication technologies such as conventional SFF-based technology. Furthermore, benefits of lower cost per port and lower cost per bit may be realized using the disclosed systems and methods because the cost of supporting functions including power supplies, fans, printed circuit boards, and chassis may be spread across a larger number of ports.

Another benefit that may be additionally or alternatively realized using the disclosed systems and methods is simplification of the management of fiber optic cables attached to an optical communication system that includes one or more optical communication modules. For example, in one embodiment the bulk, weight, cost, and complexity associated with fiber optic cabling may be greatly reduced by bundling multiple independent fibers into a single ribbon cable for coupling to an optical communication module. Individual fibers of a single ribbon cable may then be split apart or otherwise separated at a point removed from the optical communication system, e.g., split out at a patch panel with a simple fan out cable assembly for routing to different locations.

In one respect, disclosed is a fiber optic communication assembly, including: an optical communication module having a plurality of at least three fiber optic ports, the plurality of fiber optic ports being configured as an array, at least a first one of the plurality of fiber optic ports being signal-independent from at least a second one of the fiber optic ports; and a plurality of fiber optic conductors each having a first end and a second end providing an optical communication path therebetween, each of the plurality of fiber optic conductors being coupled at its first end to one of the plurality of fiber optic ports, the first ends of the plurality of fiber optic conductors being disposed in adjacent parallel relationship at the plurality of fiber optic ports. A first one of the fiber optic conductors of the fiber optic communication assembly may be coupled to the first one of the plurality of fiber optic ports to form a first signal-independent optical communication path, and a second one of the plurality of fiber optic conductors may be coupled to the second one of the plurality of fiber optic ports to form a second signal independent optical communication path. The second end of the first fiber optic conductor may be configured to be disposed in remote physical relationship to the second end of the second fiber optic conductor.

In another respect, disclosed herein is an optical communication system, including: a first optical communication module having a plurality of at least three fiber optic ports, the plurality of fiber optic ports being configured as an array, at least a first one of the plurality of fiber optic ports being signal-independent from at least a second one of the fiber optic ports; and a plurality of fiber optic conductors each having a first end and a second end providing an optical communication path therebetween, each of the plurality of fiber optic conductors being coupled at its first end to one of the plurality of fiber optic ports, the first ends of the plurality of fiber optic conductors being disposed in adjacent parallel relationship at the plurality of fiber optic ports. A first one of the fiber optic conductors of the optical communication system may be coupled to the first one of the plurality of fiber optic ports to form a first signal-independent optical communication path, and a second one of the plurality of fiber optic conductors may be coupled to the second one of the plurality of fiber optic ports to form a second signal independent optical communication path. The second end of the first fiber optic conductor may be coupled to a first fiber optic port of a second communication module to form the first signal-independent optical communication path between the first communication module and the second communication module. The second end of the second fiber optic conductor may be coupled to a first fiber optic port of a third communication module to form the second signal-independent optical communication path between the first communication module and the third communication module.

In another respect, disclosed is a method of optical communication, including providing an optical communication module having a plurality of at least three fiber optic ports, the plurality of fiber optic ports being configured as an array and being coupled to plurality of fiber optic conductors each having a first end and a second end providing an optical communication path therebetween, each of the plurality of fiber optic conductors being coupled at its first end to one of the plurality of fiber optic ports, the first ends of the plurality of fiber optic conductors being disposed in adjacent parallel relationship at the plurality of fiber optic ports, a first one of the fiber optic conductors being coupled to a first one of the plurality of fiber optic ports to form a first optical communication path, and a second one of the plurality of fiber optic conductors being coupled to a second one of the plurality of fiber optic ports to form a second optical communication path, the second end of the first fiber optic conductor being disposed in remote physical relationship to the second end of the second fiber optic conductor. The method of this embodiment may also include transmitting or receiving a first optical signal at the first fiber optic port of the first optical communication module through the first optical conductor, the first optical signal being signal-independent from an optical signal transmitted or received at the second fiber optic port of the first optical communication module.

In another respect, disclosed herein is a fiber optic communication assembly, including: an optical communication module having a plurality of fiber optic ports, the plurality of fiber optic ports being configured as a single-wafer array, at least a first one of the plurality of fiber optic ports being signal-independent from at least a second one of the fiber optic ports; a plurality of fiber optic conductors each having a first end and a second end providing an optical communication path therebetween, each of the plurality of fiber optic conductors being coupled at its first end to one of the plurality of fiber optic ports, the first ends of the plurality of fiber optic conductors being disposed in adjacent parallel relationship at the plurality of fiber optic ports. A first one of the fiber optic conductors of the fiber optic communication assembly may be coupled to the first one of the plurality of fiber optic ports to form a first signal-independent optical communication path, and a second one of the plurality of fiber optic conductors may be coupled to the second one of the plurality of fiber optic ports to form a second signal independent optical communication path. The first signal-independent optical communication path may be physically distinct from the second signal-independent optical communication path.

BRIEF DESCRIPTION OF THE DRAWINGS

In the drawings which illustrate the best mode presently contemplated for carrying out the present invention.

DETAILED DESCRIPTION OF THE INVENTION

Figure 1:
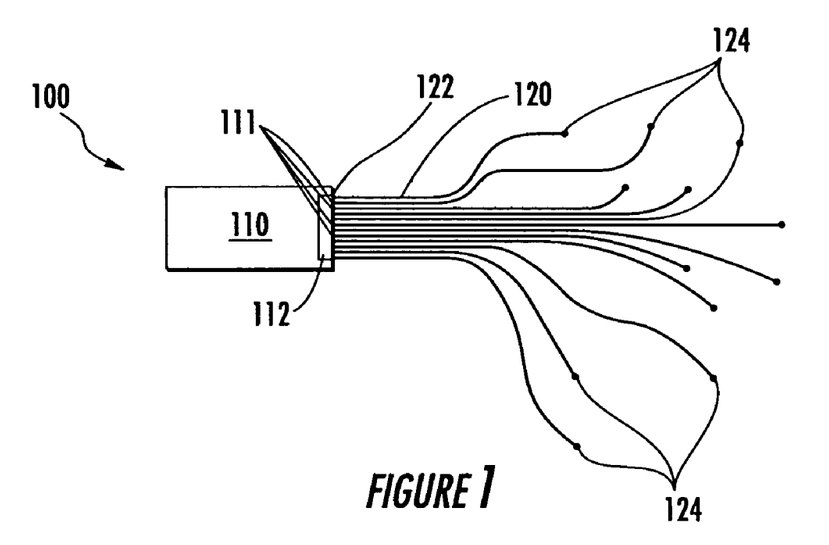
FIG. 1 is a simplified representation of a fiber optic communication assembly according to one embodiment of the disclosed system and methods.

FIG. 1 illustrates one embodiment of a fiber optic communication assembly 100 that includes an optical communication module 110 having multiple fiber optic ports 111 configured as an array 112. Multiple fiber optic conductors 120 are shown optically coupled to each of the fiber optic ports 111 of array 112. In this regard, a fiber optic conductor may be any combination of structure (e.g., fiber, filament, rod, etc.) and material (e.g., glass, plastic, etc.) suitable for conducting light waves from point to point. Although illustrated as a single segment in FIG. 1, each of fiber optic conductors 120 may include one or more individual fiber optic segments, optical connectors and/or other optical coupling devices coupled between its respective first end 122 and second end 124.

As shown in FIG. 1, multiple fiber optic conductors 120 extend from array 112 in adjacent parallel relationship (i.e., extending from array 112 in parallel or substantially parallel manner), and then diverge or otherwise separate so that each of multiple fiber optic conductors 120 defines an optical communication path that is physically distinct, i.e., they are no longer disposed in adjacent parallel relationship with other fiber optic conductors 120 (e.g., not bundled together or disposed in a ribbon fashion), and/or have lengths or paths that differ from other fiber optic conductors 120. It will be understood that each of fiber optic conductors 120 may include one or more individual fiber optic segments, connectors and/or other optical coupling devices disposed between its respective first end 122 and second end 124. A physically distinct optical communication path may also be defined by a fiber optic conductor 120 having a different physical configuration than other fiber optic conductors 120 (e.g., having differing number or type of fiber optic segments, having differing number or type of connectors, having a passive module connected at second end 124 for splitting out multiple wavelengths, etc.), although this characteristic need not necessarily be present. In this regard, a fiber optic conductor 120 may be optionally configured in one exemplary embodiment to communicate a plurality of optical signals (e.g., using wavelength division multiplexing (WDM), coarse WDM, DWDM, etc.), and may include a splitter and/or combiner at first end 122 and/or second end 124 as appropriate to split or combine a plurality of wavelengths for communication to or from given fiber optic ports of an array 112.

As further illustrated in FIG. 1, second ends 124 of multiple fiber optic conductors 120 may also be disposed in a variety of physically separate remote locations (e.g., terminating in a manner that is other than adjacent and parallel). Examples of physically remote locations at which two or more fiber optic conductors 120 may terminate include, but are not limited to, non-adjacent fiber optic port locations on a common optical communication module or chassis, locations on different modules or chassis in the same room or facility, locations in different rooms or facilities in the same building, locations in different buildings, locations in different cities or towns, locations in different telephone company central office buildings, etc). Fiber optic communication assembly 100 may be implemented alone or with other fiber optic communication assemblies for optical coupling purposes in a variety of different applications including, but not limited to, to make connections between two or more fiber optic arrays, to make backplane interconnections between multiple system modules, to make chassis-to-chassis interconnections, to make connections for arrays to single channel or multiple channel transmitters, receivers or transceivers, etc.

Still referring to the embodiment of FIG. 1, optical communication module 110 may be any optical communication device having multiple fiber optic ports 111 configured in a fiber optic array 112 that is capable of transmitting and/or receiving at least one signal-independent optical signal (e.g., single mode optical signal, multiple mode optical signal, etc.) in one of the fiber optic ports 111 of array 112. In this regard, a given fiber optic port 111 may be capable of transmitting or receiving an optical signal through a fiber optic conductor 120 that is independent (e.g., separate and different) from an optical signal that is simultaneously transmitted or received through another fiber optic conductor 120 by another fiber optic port 111 in the same fiber optic array 112 (e.g., using multiple independent transmitters and/or receivers coupled to the same array 112). For example, one fiber optic port 111 may transmit a signal that is independent and separate from a signal transmitted by another fiber optic port 111, and/or one fiber optic port 111 may transmit a signal while another fiber optic port 111 in the same array 112 may receive a separate and independent signal. It is possible that any one or more individual fiber optic ports 111 of a fiber optic array 112 may be characterized as signal-independent, and that a signal-independent fiber optic port may be coupled to a respective fiber optic conductor 120 to form a signal-independent optical communication path. In one exemplary embodiment, each fiber optic port 111 of fiber optic array 112 may be characterized as being signal-independent from all other fiber optic ports 111 in the same array 112, and multiple fiber optic ports 111 may be coupled to respective multiple fiber optic conductors 120 to form multiple signal-independent optical communication paths.

In the exemplary embodiment illustrated in FIG. 1, fiber optic array 112 is shown having 12 fiber optic ports 111 and as being configured in a 1×12 rectangular array. However, it will be understood that various other array configurations may be employed having multiple fiber optic ports configured to be coupled to multiple fiber optic conductors in adjacent parallel relationship. In one embodiment, a fiber optic array of an optical communication module may be characterized as having at least two fiber optic ports configured in an adjacent disposed relationship, alternatively as having at least three fiber optic ports configured in an adjacent disposed relationship, and further alternatively as having at least four fiber optic ports configured in an adjacent disposed relationship. Such an array may be of any suitable array geometry, as necessary or desirable for a given application (e.g., rectangular array, square array, circular array, irregular array, etc.). A rectangular or square fiber optic array may be configured with one or more columns and one or more rows. Examples of suitable types of rectangular or square arrays include, but are not limited to, single row arrays (e.g., 1×4, 1×8, 1×12, etc.), single column arrays, and general two dimensional arrays (e.g., 2×4, 2×8, 2×12, 6×12, etc.).

In the practice of the disclosed systems and methods, a fiber optic array may be configured in any density suitable for use with fiber optic conductors to form physically distinct and signal-independent optical communication paths in a manner such as described elsewhere herein. In one exemplary embodiment, a fiber optic array may be configured to have a density of less than about 0.4 inch per port, alternatively to have a density of less than about 0.3 inch per port, alternatively to have a density of less than about 0.2 inch per port, and further alternatively to have a density of about 0.1 inch per port. In another exemplary embodiment, a fiber optic array may be configured to have a density of less than about 0.1 inch per port, alternatively less than about 0.05 inch per port, and further alternatively to have a density of about 0.02 inch per port. It will be understood with benefit of this disclosure that a given density may be achieved using fiber optic arrays suitably dimensioned to achieve the given density, for example, by employing single wafer arrays (e.g., having multiple lasers formed on the same die, or one continuous wafer with multiple lasers disposed on it), although other types of arrays may be employed in other embodiments (e.g., having multiple laser packages at the die level and incorporated into a module).

As previously mentioned, optical communication module 110 may include an optical transmitter array, an optical receiver array, or a combination thereof (e.g., optical transceiver array) that has one or more signal-independent fiber optic ports 111. In this regard, any optical communication device having a fiber optic array suitable for signal independent operation in one or more fiber optic ports may be employed as optical communication module 110. Exemplary types of optical communication devices that may be employed as optical communication module 110 include, but are not limited to, vertical-cavity surface-emitting laser (VCSEL) fiber optic arrays, edge-emitting laser based fiber optic arrays, PIN photo diode detector arrays, avalanche photo diode detector arrays, LED-emitting diode fiber optic arrays, etc. Examples of suitable VCSEL fiber optic arrays that may be employed include, but are not limited to, 850-nm VCSEL arrays, 1310 nm VCSEL arrays, 1550 nm VCSEL arrays, etc. Other examples of suitable VCSEL fiber optic arrays that may be employed include, but are not limited to, VCSEL fiber optic arrays having a wavelength in the range of from about 1260 nm to about 1660 nni, although VCSEL fiber optic arrays having wavelengths of greater than about 1660 nni or less than about 1260 nm may also be suitably employed. In one exemplary embodiment, optical communication module 110 may be a 12-channel 1310 nm transmit array module or 12-channel 1310 nm receive array module. Further information on suitable VCSEL fiber optic array technology may be found described in U.S. patent application No. 10/122,707, filed Apr. 11, 2002, and entitled "Long Wavelength Vertical Cavity Surface Emitting Laser" by Naone et al., the disclosure of which is incorporated herein by reference.

Fiber optic conductors 120 may be provided together (e.g., packaged, laid out, arranged, bundled, etc.) at first end 122 in any manner suitable for orienting conductors 120 in adjacent parallel relationship for coupling with respective fiber optic ports 111. In one embodiment, fiber optic conductors 120 may be provided together at first end 122 as a parallel ribbon cable. In such an embodiment, any type of parallel ribbon cable may be employed that is suitable for coupling multiple fiber optic conductors to a corresponding suitable fiber optic array in a manner as described herein. Suitable parallel ribbon cables may be configured with any suitable number of individual fiber optic conductors to meet a given application and/or may be available from a variety of sources. Specific examples of suitable parallel ribbon cables include, but are not limited to, MTP™/MPO, MPX, SMC™, etc.

In the practice of the disclosed systems and methods, individual fiber optic conductors 120 may be provided together at first end 122 with a multiple fiber connector suitable for interconnection with a corresponding mating multiple fiber connector on optical communication device 110 so as to allow simultaneous coupling of individual fiber optic conductors 120 with respective individual fiber optic ports 111 (e.g., to connect an entire array 112 directly to a fiber ribbon cable). Specific examples of suitable multiple fiber connectors that may be employed for interconnection of multiple fiber optic conductors 120 to multiple fiber optic ports of array 112 include, but are not limited to, high density MTP™ connectors available from U.S. Connec of Hickory, N.C., MPX connectors, MPO connectors, SMC™ connectors, VF-45 connectors, etc. However, it will be understood that in other embodiments one or more of multiple fiber optic conductors 120 may be coupled to respective multiple fiber optic ports of fiber optic array 112 using other suitable type of connectors or using no connectors (e.g., conductors spliced directly into the ports). Furthermore, it is not necessary that multiple fiber optic conductors 120 be provided in the form of a parallel ribbon cable at first end 122 for connection to optical communication module 110, but instead may be provided as individual fiber optic conductors that are separately coupled to the fiber optic ports of array 112.

In one exemplary embodiment employing fiber ribbon cable and MTP™ connectors, chassis-to-chassis coupling may be achieved using a direct fiber ribbon cable link with MTP™ connectors on both chassis ends to deliver one or more independent optical signals between two chassis components. Alternatively, the illustrated embodiment may be advantageously employed to achieve a wide variety of system configurations, e.g., to efficiently connect fiber optic arrays into existing fiber infrastructures, by employing ribbon cables that fan out from a single MTP™ interface of an optical communication module 110 into individual (e.g., LC, SC, FC, etc.) connectors at a patch panel (e.g., at front-side or back-side side of patch panel). In the latter embodiment, one or more independent optical signals may be delivered from a first optical communication module 110 to two or more other separate optical modules (not shown in FIG. 1), as in a manner that will be described further herein.

As previously described, for embodiments such as those illustrated in FIG. 1, one or more optical ports of array 112 of optical communication module 110 may be signal-independent. For example, optical communication module 110 may be configured so that at least a portion the optical ports of fiber optic array 112 are each signal-independent and coupled to its own separate transmit laser or separate photodetector for transmitting or receiving a separate optical signal through a respectively coupled fiber optic conductor 120. In such an implementation, one or more control signals may be provided to facilitate signal independent operation for each of respective optical fiber optic ports of array 112. For example, a transmit disable (Tx-Disable) signal may be employed on one or more transmitting ports of array 112 to disable faulty or defective individual transmitters, without affecting other properly operating transmitters coupled to other ports of array 112. It will be understood that such a Tx-Disable signal may be employed by an optical communication module 110 that is configured as optical communication transmitter module, or that is configured as an optical transceiver module in order to control operation of individual transmit lasers employed therein. Similarly, a loss of signal (LOS) control signal may be employed on each receiving port of array 112 of an optical communication module 110 (e.g., optical receiving module, optical transceiving module) to facilitate independent operations of each signal independent optical communication path through an associated fiber optic conductor 120.

In one embodiment of the disclosed systems and methods, it is possible to further facilitate signal-independent operation of one or more optical communication paths by enhancing channel isolation so as to reduce cross talk that may occur between individual fiber optic conductors 120 (e.g., caused by spill-over light from a laser into an adjacent fiber not directly coupled to that laser). This may be particularly desirable in those embodiments where one or more fiber optic conductors 120 vary in length from one or more other fiber optic conductors 120 coupled to the same fiber optic array 112, and/or where one or more fiber optic conductors 120 have second ends 124 that terminate in a location physically remote from the second ends 124 of other fiber optic conductors 120. Under such conditions, adverse effects such as cross talk may be exacerbated by greatly increased attenuation of an incoming optical signal at a fiber optic receiving port III of an optical communications module 110 coupled to an fiber optic conductor 120. In this regard, incoming signal variability experienced by a single optical communication module 110 between two or more fiber optic conductors 120 that define physically distinct optical communication paths (e.g., having independent signals originating at physically remote locations, having different lengths, etc.) is typically greater than the incoming signal variability experienced between multiple fiber optic conductors having the same length and that are routed in adjacent parallel relationship along their entire lengths, e.g., such as a fiber ribbon cable used in a conventional single-point-to-single point application employing a single high bandwidth transmitter and single high bandwidth receiver.

Figure 2:
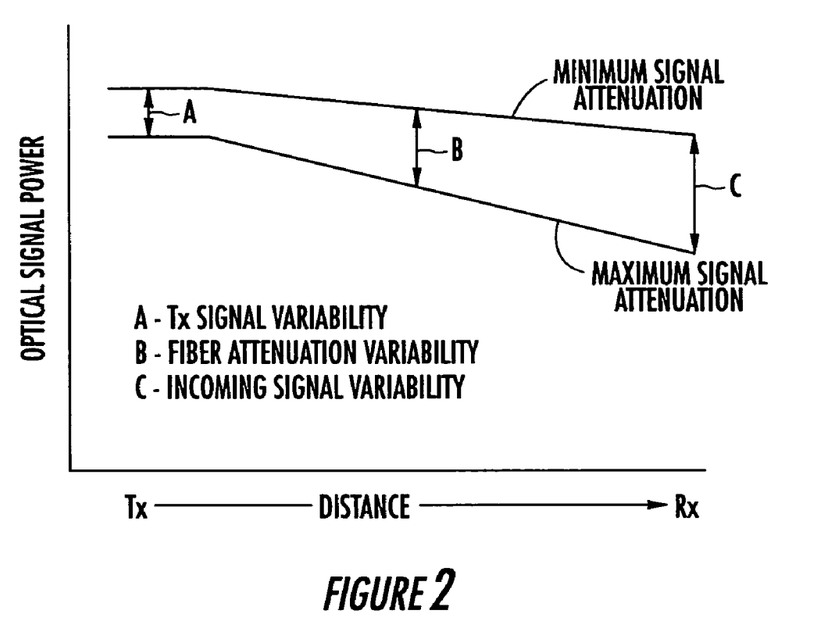
FIG. 2 illustrates optical signal variability as a function of distance for a fiber optic communication system employing conventional single point-to-point ribbon fiber cabling.
Figure 3:
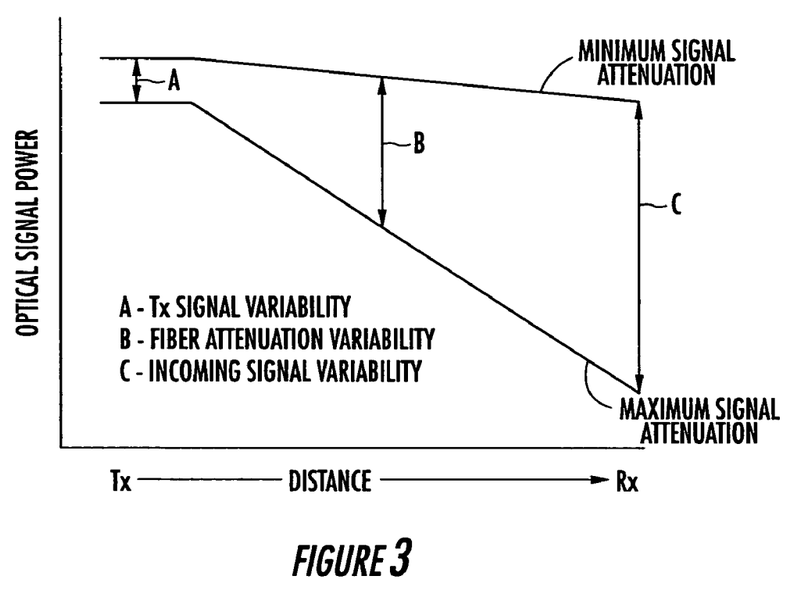
FIG. 3 illustrates optical signal variability as a function of distance for an optical communication system employing multiple signal-independent and physically distinct optical communication paths according to one embodiment of the disclosed systems and methods.

FIG. 2 and FIG. 3 are representations of signal variability for multiple fiber optic conductors as a function of distance between fiber optic transmission ports and fiber optic receiver ports. In this regard, FIG. 2 represents signal variability experienced between individual fiber optic conductors that are arranged in adjacent parallel relationship (e.g., ribbon fiber cable) for single-point-to-single point optical communication, e.g., from fiber optic transmission ports of the same fiber optic array to fiber optic receive ports of the same fiber optic array. In contrast, FIG. 3 represents signal variability experienced between individual fiber optic conductors that define physically distinct and signal independent optical communication paths, such as for multiple-point-to-single point optical communication, e.g., from multiple fiber optic transmission ports positioned at physically remote second ends 124 through fiber optic conductors 120 to fiber optic receive ports 111 of optical communication module 110. As may be seen by comparing FIG. 2 with FIG. 3, fiber attenuation variability (B) is much greater between individual fiber conductors that define physically distinct optical communication paths than it is between individual parallel conductors of a single-point-to-single point ribbon fiber cable configuration, resulting in a much greater variability in incoming optical signal strength (C) between different optical communication paths as experienced by a given optical communication module of a multiple-point-to-single point optical communication path configuration. It may also be seen from FIGS. 2 and 3 that maximum fiber attenuation and signal variability increases with distance between fiber optic transmission and receive ports, making the task of configuring a given optical communication module to accept such widely variable signals in a standards-compliant manner more difficult with increasing length of optical communication paths. Although illustrated with respect to distance, it will be understood that increases in signal variability may additionally or alternatively result from differing number and quality of optical conductors and/or connectors that are employed to define one or more optical communication paths of a given system.

In one embodiment of the disclosed systems and methods, a fiber optic communication assembly 100 may be further configured to provide one or more standards-compliant optical communication paths using any system configuration in which optical signals may be transmitted and/or received across optical conductors and, in one exemplary embodiment, may be configured to provide standards compliance under signal variability conditions described and illustrated in relation to FIG. 3. In one example, the disclosed systems and methods may be implemented to enable optical communication module 110 to transmit and/or receive optical communication signals through optical conductors 120 that are compliant to signal-independent optical communication standards, e.g., as may be established by standards bodies such as the IEEE, ITU or ANSI standards groups. Specific examples of such signal-independent standards include, but are not limited to, IEEE 802.3z Gigabit Ethernet 1000 BASE-LX Standards, SONET Short-reach OC-1 through OC-48 standards, Telcordia Technologies GR-253 CoreSONET standards, ANSIT1, ESCON, etc. Such standards-compliant optical communication paths may be enabled, for example, by using any suitable optical communication module 110 or combination of multiple optical communication modules 110 that is capable of achieving channel isolation and reduction in cross talk sufficient to achieve optical bit error rate ("BER") design objectives necessary to meet a given standard (e.g., despite wide incoming signal variability that may be experienced in system configuration as described and illustrated in relation to FIG. 3).

In one embodiment of the disclosed systems and methods, pairs of VCSEL fiber optic transmit and PIN photodiode detector receive ports may be employed to support signal compliance of independent incoming signals from multiple and physically distinct optical communication paths that exhibit a relatively large difference in signal variability by enhancing channel isolation so as to reduce cross talk and preserve independent signal integrity. For example, signal-independent and standards-compliant optical communication paths through optical conductors 120 may be enabled by configuring an optical communication module 110 with a single mode VCSEL having spatially varying optical loss to provide single-mode operation, such as described in U.S. Pat. No. 6,751,245, filed Jun. 15, 2004, and entitled "Single Mode Vertical Cavity Surface Emitting Laser", the disclosure of which is incorporated herein by reference. Such a single mode VCSEL may be implemented, for example, as part of a standards-compliant optical communication transmitter module having a self adjusting data transmitter driver that is capable of monitoring characteristics of an optical data signal and that is further capable of using feedback (e.g., based on parameters such as BER, data eye, discreet optical data integrity parameters, and discreet optical parameters) to adjust the optical quality of the laser output towards optimization in order to meet standards compliance. Such a self-adjusting data transmitter driver is described in U.S. patent application Ser. No. 10/028,830, filed Dec. 20, 2001, and entitled "Self-Adjusting Data Transmitter" by Yorks, the disclosure of which is incorporated herein by reference.

Alternatively, a photodetector may be implemented as part of a standards compliant optical communication receiver module having an opto-electronic device configured as a photo detector and having an on-chip capacitor design that utilizes combinations of capacitors and resistors to reduce cross talk among adjacent detectors in fiber optic arrays. Such a technology is described in U.S. Pat. No. 6,774,448, issued Aug. 10, 2004, and entitled "High Speed Detectors Having Integrated Electrical Components" by Lindemann et al., the disclosure of which is incorporated herein by reference.

Figure 4:
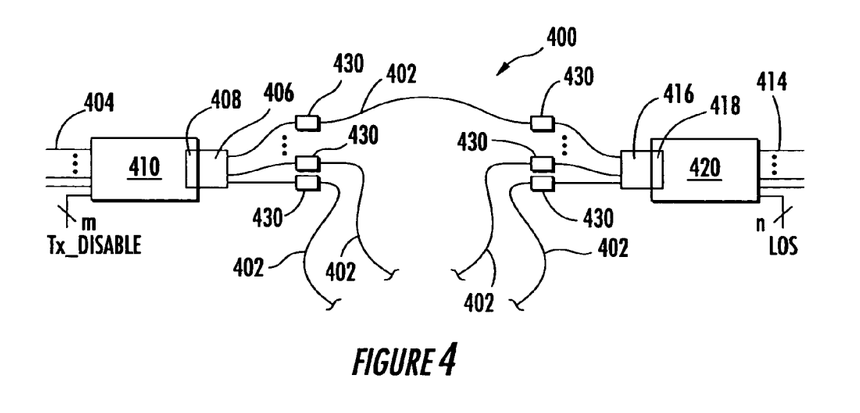
FIG. 4 is a simplified representation of a fiber optic communications system according to one embodiment of the disclosed systems and methods.

FIG. 4 illustrates one exemplary embodiment of an optical communication system 400 having an optical communication transmitter module 410 in optical signal communication with an optical communication receiver module 420 via at least one optical conductor 402 providing a signal-independent optical communication path therebetween. As illustrated in FIG. 4, optical communication transmitter module 410 is provided with "m" number of multiple transmitter input signals 404, each of which corresponds to a separate signal independent fiber optic transmitter port of fiber optic array 408 of optical communication transmitter module 410. A multiple fiber connector 406 is provided for connecting individual optical conductors 402 in adjacent parallel relationship to respective signal-independent fiber optic ports (not shown) of array 408. Similarly, multiple optical conductors 402 are coupled to respective signal independent fiber optic ports (not shown) of fiber optic array 418 of optical communication receiver module 420 using multiple fiber connector 416. An "n" number of multiple receiver output signals 414 corresponding to respective signal-independent fiber optic ports of array 418 are provided for optical communication receiver module 420 as illustrated. Although FIG. 4 illustrates an optical communication transmitter module 410 coupled to an optical communication receiver module 420 via at least one optical conductor 402, it will be understood that either one or both of optical communication modules 410 and 420 may be optical transceiver modules, e.g., with a fiber optic transmitter port of transceiver module 410 coupled to a fiber optic receiver port of transceiver module 420. Further, it will be understood that modules 410 and 420 may be coupled together with two or more optical conductors 402 in a manner similar as illustrated for at least one optical conductor of FIG. 4. In such a case, it will be understood that any two or more optical communication paths may be physically distinct from each other even though they are coupled between the same two modules.

In the embodiment illustrated in FIG. 4, any desired number of optical conductors 402 may be coupled to fiber optic array ports of optical communication transmitter module 410 and/or optical communication receiver module 420. Furthermore, it will be understood it is possible that a number of optical conductors 402 (e.g., 12) may be coupled to fiber optic array ports of optical communication transmitter module 410 that differs from the number of optical conductors 402 (e.g., 8) coupled to fiber optic array ports of optical communications receiver module 420. This may result, for example, where optical communication transmitter module 410 is provided with a different number of fiber optic array ports than is optical communication receiver module 420, and/or when not all fiber optic array ports of one or both modules are coupled to a respective optical conductor 402 (i.e., not all fiber optic ports of a given module array need be used or coupled to an optical conductor, nor do all optical conductors of a given multiple fiber connector need be used or coupled to a fiber optic port). Furthermore, as will be illustrated and described further herein, it is also possible that only one of optical communication modules 410 and 420 may be configured with an array of multiple signal-independent fiber optic ports, with the other module being alternatively configured to have a single signal-independent fiber optic port coupled to a optical conductor 402 via a single fiber connector, e.g., LC connector, SC connector, FC connector, directly connected to an optical transmitter or receiver through splices, etc.

In the embodiment illustrated in FIG. 4 intermediate fiber connectors 430 are illustrated as being present within each of the optical communication paths defined by optical conductors 402. It will be understood that intermediate fiber connectors 430 are optional and may not be present in any given optical communication path defined by an optical conductor 402, and/or that more than two intermediate fiber connectors 430 may be present in any given optical communication path defined by an optical conductor 402. Intermediate fiber conductors may be any type of connector suitable for coupling two or more fiber optic segments together, alone or in parallel with other fiber optic segments. Examples of intermediate fiber connectors include, but are not limited to, patch panel connector, bulkhead feedthroughs, optical cross connects, switches, etc. In one exemplary embodiment, an intermediate fiber connector 430 may be a patch panel that facilitates distribution or separation of optic conductors 120, e.g. transitioning from a parallel ribbon fiber cable configuration to a distributed and physically distinct separate fiber configuration.

Further illustrated in FIG. 4 are "m" number of Tx-Disable control signals (e.g., one for each independent signal transmitted by optical communication transmitter module 410). Similarly shown are "n" number of LOS control signals (e.g., one for each independent signal received by optical communication receiver module 420).

These control signals may be advantageously employed in a manner as previously described to facilitate signal-independent operation for each of the signal-independent fiber optic ports of arrays 408 and 418, and their associated signal-independent optical communication paths defined by optical conductors 402.

Figure 5A:
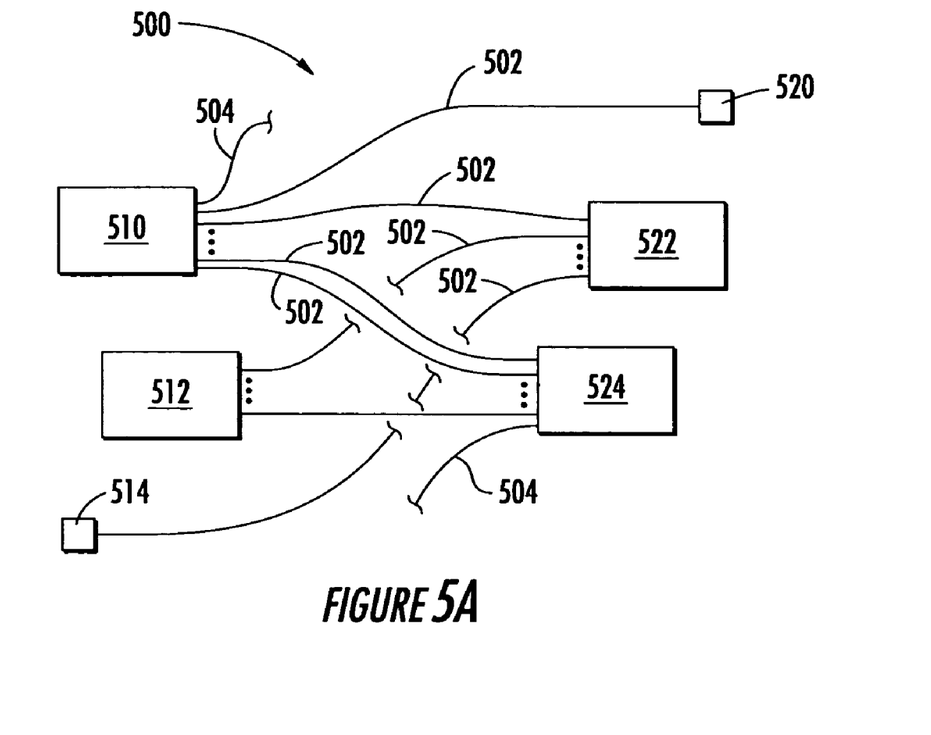
FIG. 5A is a simplified representation of another fiber optic communications system according to one embodiment of the disclosed systems and methods.

FIG. 5A illustrates an exemplary fiber optic communication system 500 that includes multiple optical communication transmitter modules (i.e., 510, 512, and 514) and multiple optical communication receiver modules (i.e., 520, 522, and 524) coupled together by multiple signal independent optical conductors 502. It will be understood that the system configuration illustrated in FIG. 5A is exemplary only, and is illustrative of the types of fiber optic system configurations that may be present in a given embodiment of the disclosed systems and methods. For example, it will be understood that any combination of two or more of the optical communication transmitter modules and optical communication receiver modules illustrated in FIG. 5A may be employed separately or in combination with other optical communication modules as desired to achieve a desired system configuration. Furthermore, it will be understood that any one or more of modules 510, 512, 514, 520, 522, and/or 524 may be optical communication transceiver modules (e.g., one or more separate receiver modules and/or transmitter modules coupled to transceiver module, one or more transceiver modules coupled to other transceiver modules, etc.).

As illustrated in FIG. 5A, two or more optical communication transmitter modules (e.g., 510 and 512) having the same or different number of signal-independent fiber optic transmit ports may be coupled to two or more optical communication receiver modules (e.g., 522 and 524) having the same or different number of signal-independent fiber optic receiver ports, via one or more signal-independent optical communication paths defined by optical conductors 502 coupled between each given pair of coupled optical communication modules. Furthermore, an optical communication transmitter module 510 having multiple signal-independent fiber optic ports may be coupled to an optical communication receiver module 520 having a single fiber optic detector port. Likewise, an optical communication transmitter module 514 having a single fiber optic transmit port may be coupled to an optical communication receiver module 522 having multiple signal-independent fiber optic ports.

Not shown in FIG. 5A are other optical communication modules that may be coupled, for example, to optical communication transmitter module 510 and optical communication receiver module 524 via signal-independent optical communication paths defined by optical conductors 504. It will also be understood with regard to FIG. 5A that it is possible that instead of being single fiber optic port modules, optical communication transmitter module 514 and/or optical communication receiver module 520 may alternatively be optical communication modules having multiple signal-independent fiber optic ports, but to which only one optical conductor 502 is coupled.

In the embodiment of FIG. 5A, any suitable optical conductor configuration as previously described herein may be employed to couple two respective optical communication modules (e.g., optical communication transmitter module to optical communication receiver module, optical communication transmitter module to optical transceiver module, optical communication receiver module to optical transceiver module, optical transceiver module to optical transceiver module). In this regard, each optical conductor may define an optical communication path including one or more optical conductor segments that may or may not be interconnected by one or more fiber optic connectors. Furthermore, each optical conductor may be coupled to a given optical communication module via a connector (e.g., multiple fiber connector or single fiber connector as appropriate) or may be hardwired or spliced directly to fiber optic ports of a given optical communication module.

Figure 5B:
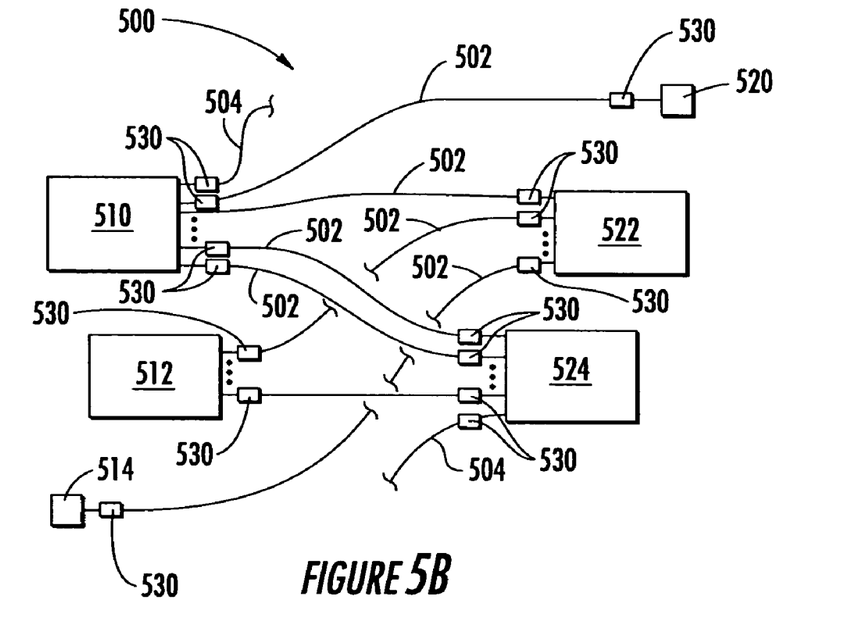
FIG. 5B is a simplified representation of another fiber optic communications system according to one embodiment of the disclosed systems and methods.

FIG. 5B illustrates another exemplary fiber optic communication system 500 that includes multiple optical communication transmitter modules (i.e., 510, 512, and 514) and multiple optical communication receiver modules (i.e., 520, 522, and 524) coupled together by multiple signal independent optical conductors 502 having intermediate fiber connectors 530 that may include, for example, one or more patch panels that facilitate distribution or separation of optic conductors 120 in a manner as previously described.

The disclosed systems and methods described and illustrated herein may be employed as part of any optical communication system that is utilized to transmit and/or receive two or more signal-independent optical signals between at least two optical communication modules. Examples of types of implementation environments in which disclosed systems and methods may be employed include, but are not limited to, network applications (e.g., LAN, MAN, WAN SAN, etc.), switch applications (e.g., digital SONET, Ethernet, Fibre Channel, industrial control lines, internal and/or external optical interconnects in entertainment equipment systems, etc.). Specific examples of network applications in which the disclosed systems and methods may be employed include, but are not limited to, in the last mile network of a metropolitan area network, in a high speed hub and spoke distribution system (e.g., network, data center, or intersystem communication architecture), in a local area network, in a tree-structure network, etc. Specific examples of switch applications in which the disclosed systems and methods may be employed include, but are not limited to, in digital cross-connect switches, SONET drop multiplexers, Ethernet switches, IP routers, dense wavelength division multiplexing transport equipment, multi-service protocol provisioning platforms, Fibre Channel switches, aggregation equipment, Optical cross connect, etc.

Figure 6:
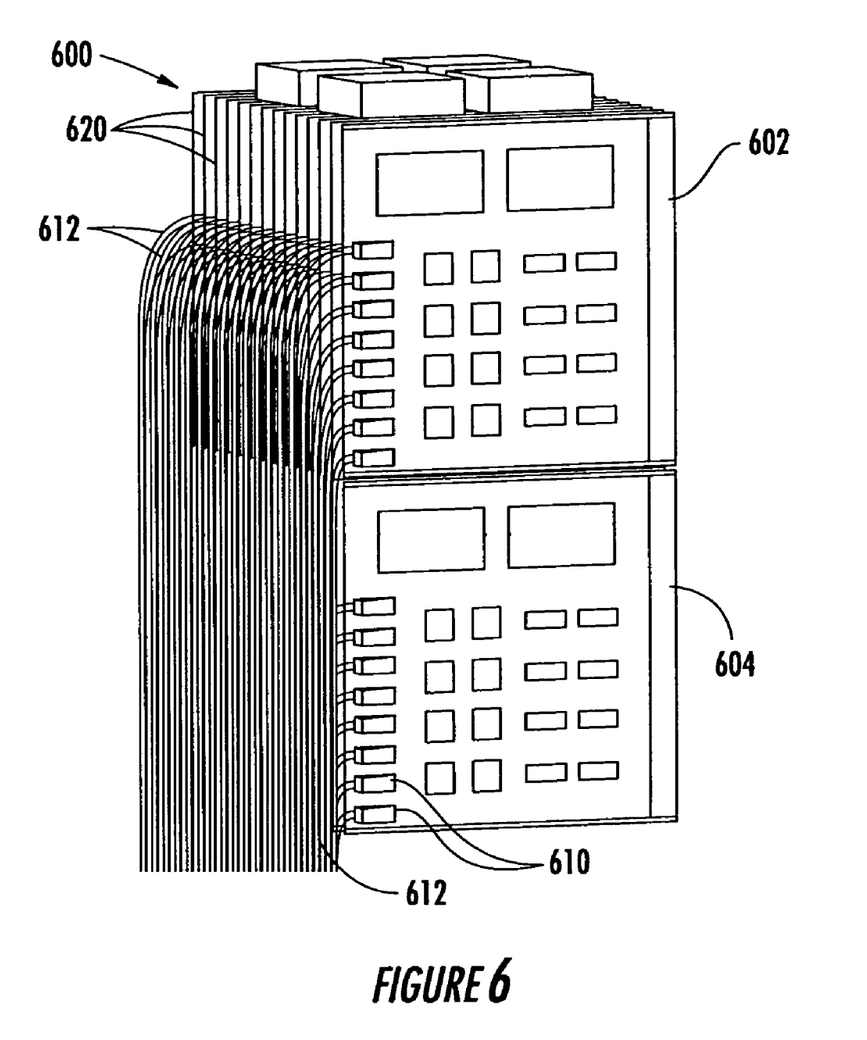
FIG. 6 is a perspective view of a SONET fiber optic metro system based on conventional small form factor transceivers.

FIG. 6 illustrates one example of a Synchronous Optical Network ("SONET") metro system 600 based on conventional SFF transceivers 610 mounted on the edges of multiple cards 620 of each of system components 602 and 604 of system 600. As illustrated in FIG. 1, each SFF transceiver 610 is coupled to a respective two-fiber cable 612. Each SFF transceiver has a separate transmitter and receiver corresponding to each of the two respective fibers within each cable 612. Thus, as illustrated in FIG. 6, a total of 16 SFF transceivers 610 provided by two system components 602 and 604 are required to provide 32 separate optical communication paths per card 620 (i.e., 16 separate transmit paths and 16 separate receive paths).

Figure 7:
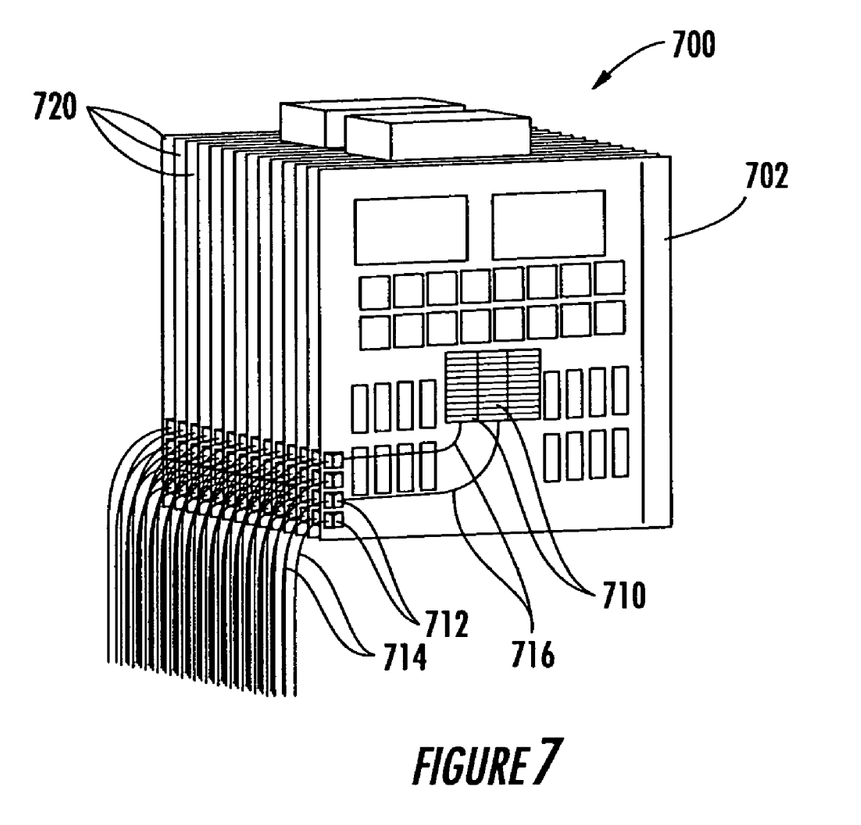
FIG. 7 is a perspective view of a SONET fiber optic metro system according to one embodiment of the disclosed systems and methods.

FIG. 7 illustrates a SONET metro system based on 1310 nm VCSEL fiber optic array modules 710 according to one embodiment of the disclosed system and methods. As shown in FIG. 7, four fiber optic array modules 710 are provided that interconnect with four fiber optic MTP™ connectors 712 at the edges of multiple cards 720 of component 702 of system 700. Parallel fiber optic connectors 712 are in turn shown interconnected to parallel fiber optic ribbon cables 714, which serve to couple system 700 to other optical communication modules or systems (not shown). A jumper cable 716 is shown provided on each card to interconnect each fiber optic array module 710 with a respective fiber optic MTP™ connector 712. However, it will be understood that a module 710 may be alternatively mounted on the edge of a card 720, e.g., for direct interconnection with a respective fiber optic MTP™ connector 712, so that a jumper cable 716 is not required.

In one exemplary implementation of FIG. 7, each fiber optic array module 710 may be configured with eight fiber optic ports, and cables 712 and 714 may each have eight fiber optic conductors. In one embodiment, two fiber optic array modules may be configured as optical communication transmitter modules and two fiber optic array modules may be configured as optical communication receiver modules. As so configured, the embodiment illustrated in FIG. 7 is capable of providing 32 separate signal-independent optical communication paths (i.e., 16 separate transmit paths and 16 separate receive paths) per card 720 from one system component 702, eliminating the need for an extra system component and its associated hardware and power needs (e.g., power supplies, cooling fans, etc.) required by conventional system 600. Furthermore, a visual comparison of conventional system 600 of FIG. 6 with system 700 of FIG. 7 illustrates the greatly improved density and smaller overall system size possible with implementations of the disclosed systems and methods. Thus, FIG. 7 illustrates the significant advantages that may be achieved using one embodiment of the disclosed systems and methods over conventional SONET metro systems based on SFF transceivers. It will be understood that the embodiment of FIG. 7 is exemplary only, and that further increases in density and/or reduction in size are possible, for example, by configuring fiber optic array module 710 to have more than eight fiber optic ports (e.g., 12 or more fiber optic ports), and by configuring each of cables 712 and 714 with a number of fiber optic conductors (e.g., 12 or more fiber optic conductors) corresponding to the number of fiber optic ports.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus, systems and methods may be utilized in various combinations and/or independently. Thus the invention is not limited to only those combinations shown herein, but rather may include other combinations.

What is claimed is:

1. An optical communication system, comprising:
a plurality of fiber optic conductors each having a first end and a second end providing an optical communication path therebetween, said first ends of said plurality of fiber optic conductors being separated into at least a first group and a second group, said first ends of said fiber optic conductors in said first group being arranged in a first set of fiber optic ports within an MTP connector, said first ends of said fiber optic conductors in said second group being arranged in a second set of fiber optic ports within said MTP connector;
a first optical communication module having a plurality of optoelectronic devices thereon, said plurality of optoelectronic devices being configured into at least a first and second array adjacent an MTP connector port,
wherein said MTP connector is received into said MTP connector port with said first end of each of said fiber optic conductors in said first group is coupled to one of each of said plurality of optoelectronic devices in said first array and said first end of each of said fiber optic conductors in said second group is coupled to one of each of said plurality of optoelectronic devices in said second array, and
wherein each optoelectronic device and each of said coupled fibers form individual signal independent optical communication paths; and
a control device in communication with each of said optoelectronic devices in said first and second arrays of optoelectronic devices, said control device capable of controlling each of said optoelectronic devices separately and independently relative to one another.

2. The optical communication system of claim 1, wherein said plurality of fiber optic conductors is exactly eight fiber optic conductors.

3. The optical communication system of claim 2 wherein said plurality of optoelectronic devices is exactly eight optoelectronic devices, wherein four of said optoelectronic devices are optical communication transmitter modules arranged in said first array, and four of said optoelectronic devices are optical communication receiver modules arranged in said second array.

4. The optical communication system of claim 3, wherein each of said optoelectronic devices is signal-independent from all other of said plurality of said optoelectronic devices.

5. The optical communication system of claim 3, wherein said first group of said first ends of fiber optic conductors includes exactly four first ends of said fiber optic conductors coupled to said array of transmitters and said second group of said first ends of fiber optic conductors includes exactly four first ends of said fiber optic conductors coupled to said array of receivers.

6. The optical communication system of claim 5, wherein one of each of said first ends in said first group is associated with one of each of said first ends in said second group thereby forming four pairs of signal-independent transmit/receive optical communication paths.

7. The optical communication system of claim 5 wherein said MTP connector is a 12 optical port connector having optical ports labeled 1–12 consecutively, said first group of first ends of fiber optic conductors being arranged in four adjacent optical ports within ports 1–6 on said MTP connector and said second group of first ends of fiber optic conductors being arranged in four adjacent optical ports within ports 7–12 on said MTP connector.

8. The optical communication system of claim 7, wherein said first group of first ends are arranged in optical ports 2–5, said second group of first ends are arranged in optical ports 8–11 and optical ports 1, 6, 7 and 12 are empty.

9. The optical communication system of claim 5, wherein said MTP connector is a 24 optical port connector having a first row of 12 optical ports labeled 1–12 consecutively and a second row of optical ports labeled 13–24 parallel to said first row, said first group of first ends of fiber optic conductors being arranged in four optical ports within ports 1–12 on said MTP connector and said second group of first ends of fiber optic conductors being arranged in four optical ports within ports 13–24 on said MTP connector.

10. The optical communication system of claim 9, wherein said first group of first ends are arranged in optical ports 4, 6, 8 and 10, said second group of first ends are arranged in optical ports 16, 18, 20 and 22 and the remaining optical ports are empty.

11. The optical communication system of claim 3, wherein said array of optical communication transmitter modules comprises an array of VCSEL optical communication modules having a wavelength in the range of from about 1260 nm to about 1660 nm.

12. The optical communication system of claim 1, wherein said control device controls at least one of said optoelectronic devices using a first signal-independent optical communication standard, and said control device controls the remaining optoelectronic devices using a second signal-independent optical communication standard, said first and second standards being different from each other.

13. The optical communication system of claim 1, wherein said control device controls at least one of said optoelectronic devices to generate a plurality of multiplexed optical signals using wavelength division multiplexing.

14. A method of optical communication, comprising:
providing an optical communication module comprising an array of eight transmitters, receivers or transceivers each of which is coupled to a plurality of at least eight fiber optic ports, said plurality of fiber optic ports being configured as a closely spaced array in an MTP connector port;
providing an array of eight fiber optic conductors each having a first end and a second end providing an optical communication path therebetween, said fiber optic conductors being coupled to an MTP connector including an array of at least eight fiber optic ports, each of said first ends of said fiber optic conductors being coupled to one of said plurality of fiber optic ports in said MTP connector,
wherein said MTP connector is received in said MTP connector port, each of said fiber optic ports in said MTP connector aligning with a corresponding fiber optic port in said MTP connector port such that each of said first ends of said eight fiber optic conductors is coupled with a corresponding optical communication module to form eight separate optical communication paths,
wherein at least one of said second ends of said eight fiber optic conductors is disposed in remote physical relationship to said remaining second ends of said fiber optic conductors; and
transmitting or receiving a first optical signal along at least one of eight optical communication paths, said first optical signal being signal-independent from a second distinct optical signal transmitted or received along at least one of the remaining optical communication paths.

15. The method of claim 14, wherein said method further comprises transmitting or receiving said first optical signal as one of plurality of multiplexed optical signals using wavelength division multiplexing.

16. The method of claim 14, wherein said optical communication module includes exactly four transmitters and four receivers, each of said transmitters being grouped with one of each of said receivers to form four transmit/receive pairs, wherein each of said first ends of said fiber optic conductors coupled to each of said transmit/receive pairs are also grouped into pairs corresponding to the grouping of the transmit/receive pairs to form four pairs of signal-independent transmit/receive optical communication pathways.

17. The method of claim 16, wherein said MTP connector is a 12 optical port connector having optical ports labeled 1–12 consecutively, said group of first ends of fiber optic conductors coupled to said receivers being arranged in four adjacent optical ports within ports 1–6 on said MTP connector and said group of first ends of fiber optic conductors coupled to said transmitters being arranged in four adjacent optical parts within ports 7–12 on said MTP connector.

18. The method of claim 17, wherein said group of first ends coupled to said receivers are arranged in optical ports 2–5, said group of first ends coupled to said transmitters are arranged in optical ports 8–11 and optical ports 1, 6, 7 and 12 are empty.

19. The method of claim 16, wherein said MTP connector is a 24 optical port connector having a first row of 12 optical ports labeled 1–12 consecutively and a second row of optical ports labeled 13–24 parallel to said first row, said group of first ends of fiber optic conductors coupled to said transmitters being arranged in four optical ports within ports 1–12 on said MTP connector and said group of first ends of fiber optic conductors coupled to said receivers being arranged in four optical ports within ports 13–24 on said MTP connector.

20. The method of claim 19, wherein said group of first ends coupled to said transmitters are arranged in optical ports 4, 6, 8 and 10, said group of first ends coupled to said receivers are arranged in optical ports 16, 18, 20 and 22 and the remaining optical ports are empty.

21. The method claim 16, wherein said array of optical communication transmitter modules comprises an array of VCSEL optical communication modules having a wavelength in the range of from about 1260 nm to about 1660 nm.

22. The optical communication system of claim 14, wherein said control device controls at least one of said optoelectronic devices using a first signal-independent optical communication standard, and said control device controls the remaining optoelectronic devices using a second signal-independent optical communication standard, said first and second standards being different from each other.

23. An optical communication system, comprising:
an array of eight fiber optic conductors each having a first end and a second end providing an optical communication path therebetween, said first ends of said array of fiber optic conductors being separated into a first and second group of four fiber optic conductors each, said first ends of said fiber optic conductors in said first group being arranged in a first set of fiber optic ports within an MTP connector, said first ends of said fiber optic conductors in said second group being arranged in a second set of fiber optic ports within said MTP connector;
an optical communication module having eight optoelectronic devices thereon, said optoelectronic devices being configured into a first and second array of four optoelectronic devices each, said first and second array adjacent an MTP connector port,
wherein said MTP connector is received into said MTP connector port with said first end of each of said fiber optic conductors in said first group being coupled to one of each of said optoelectronic devices in said first array and said first end of each of said fiber optic conductors in said second group being coupled to one of each of said optoelectronic devices in said second array, and
wherein each optoelectronic device and each of said coupled fibers form individual signal independent optical communication paths; and
a control device in communication with each of said optoelectronic devices in said first and second arrays of optoelectronic devices, said control device capable of controlling each of said optoelectronic devices separately and independently relative to one another.

24. The optical communication system of claim 23, wherein said four optoelectronic devices in said first array are optical communication transmitter modules, and said four optoelectronic devices in said second array are optical communication receiver modules.

25. The optical communication system of claim 24, wherein one of each of transmit communication paths is associated with one of each of said receive communication paths thereby forming four pairs of signal-independent transmit/receive optical communication paths.

26. The optical communication system of claim 25 wherein said MTP connector is a 12 optical port connector having optical ports labeled 1–12 consecutively, said first group of first ends of fiber optic conductors being arranged in four adjacent optical ports within ports 1–6 on said MTP connector and said second group of first ends of fiber optic conductors being arranged in four adjacent optical ports within ports 7–12 on said MTP connector.

27. The optical communication system of claim 26, wherein said first group of first ends are arranged in optical ports 2–5, said second group of first ends are arranged in optical ports 8–11 and optical ports 1, 6, 7 and 12 are empty.

28. The optical communication system of claim 25, wherein said MTP connector is a 24 optical part connector having a first row of 12 optical ports labeled 1–12 consecutively and a second row of optical ports labeled 13–24 parallel to said first row, said first group of first ends of fiber optic conductors being arranged in four optical ports within ports 1–12 on said MTP connector and said second group of first ends of fiber optic conductors being arranged in four optical ports within ports 13–24 on said MTP connector.

29. The optical communication system of claim 28, wherein said first group of first ends are arranged in optical ports 4, 6, 8 and 10, said second group of first ends are arranged in optical ports 16, 18, 20 and 22 and the remaining optical ports are empty.

30. The optical communication system of claim 23, wherein each of said optoelectronic devices is signal-independent from all other of said optoelectronic devices.

31. The optical communication system of claim 23, wherein said control device controls at least one of said optoelectronic devices using a first signal-independent optical communication standard, and said control device controls the remaining optoelectronic devices using a second signal-independent optical communication standard, said first and second standards being different from each other.

32. The optical communication system of claim 23, wherein said control device controls at least one of said optoelectronic devices to generate a plurality of multiplexed optical signals using wavelength division multiplexing.

33. The optical communication system of claim 32, wherein said array of optical communication transmitter modules comprises an array of VCSEL optical communication modules having a wavelength in the range of from about 1260 nm to about 1660 nm.

* * * * *